United States Patent
Devine et al.

(10) Patent No.: US 10,214,150 B2
(45) Date of Patent: Feb. 26, 2019

(54) VEHICLE STORAGE COMPARTMENT

(71) Applicant: FORD GLOBAL TECHNOLOGIES, LLC, Dearborn, MI (US)

(72) Inventors: Victoria Marie Devine, South Lyon, MI (US); Matthew Enciso, Highland, MI (US); Andrew Schafer, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 15/440,184

(22) Filed: Feb. 23, 2017

(65) Prior Publication Data

US 2018/0236943 A1 Aug. 23, 2018

(51) Int. Cl.
*B60R 7/06* (2006.01)

(52) U.S. Cl.
CPC ............. *B60R 7/06* (2013.01); *B60Y 2306/01* (2013.01)

(58) Field of Classification Search
CPC .............................. B60R 7/06; B60Y 2306/01
See application file for complete search history.

(56) References Cited

U.S. PATENT DOCUMENTS

| 4,135,761 | A | * | 1/1979 | Ward | B60R 9/02 29/401.1 |
|---|---|---|---|---|---|
| 9,016,748 | B1 | | 4/2015 | Ardigo | |
| 9,738,227 | B2 | * | 8/2017 | Huebner | B60R 7/08 |
| 2007/0013202 | A1 | * | 1/2007 | Tompson | B60R 7/04 296/37.1 |
| 2007/0133217 | A1 | * | 6/2007 | Tiesler | B60R 11/00 362/459 |
| 2007/0267885 | A1 | * | 11/2007 | Thelen | B60R 9/00 296/37.6 |

FOREIGN PATENT DOCUMENTS

| DE | 197 52 786 A1 | 6/1998 |
|---|---|---|
| EP | 2 610 110 A1 | 7/2013 |

* cited by examiner

*Primary Examiner* — Lori L Lyjak
(74) *Attorney, Agent, or Firm* — Vichit Chea; Brooks Kushman, P.C.

(57) ABSTRACT

A vehicle storage compartment includes a structural skeletal frame and a compressible shell supported on and in contact with back and sides of, and enveloping, the skeletal frame to form an owner's manual bin having interior rear walls partially defined by exposed surfaces of the skeletal frame.

20 Claims, 6 Drawing Sheets

VEHICLE STORAGE COMPARTMENT

TECHNICAL FIELD

The present disclosure relates to vehicle storage compartments. Particularly, this disclosure relates to owner's manual bins for motor vehicles.

BACKGROUND

Motor vehicles may include owner's manual bins to store owner's manuals for the respective vehicle. The owner's manual bin may be disposed within a glove compartment of an interior of the vehicle. It may be desirable to increase collapsibility of the owner's manual bin such that the bin absorbs a larger amount of energy upon impact. It also may be desirable to maintain supportability of the bin such that the manual (and perhaps other items) can be suitably stored therein.

SUMMARY

According to an embodiment, a vehicle storage compartment includes a structural skeletal frame and a compressible shell supported on and in contact with back and sides of, and enveloping, the skeletal frame to form an owner's manual bin having interior rear walls partially defined by exposed surfaces of the skeletal frame.

According to another embodiment, a vehicle storage compartment including a skeletal frame forming a support for an owner's manual bin. The frame has a front perimeter defining an opening to the bin, a first side extending from the perimeter, and a back disposed opposite the opening. The vehicle storage compartment further includes a compressible shell disposed over and extending from the perimeter to define an interior of the bin. The shell is in contact with the back and first side of the frame.

According to another embodiment, a vehicle storage compartment including a skeletal frame extending from an opening of an owner's manual bin. The vehicle storage compartment further includes a compressible shell comprising a fibrous material supported on and in contact with back and lateral sides of, and enveloping, the frame to form a body of the bin having interior walls defined by exposed surfaces of the frame and the fibrous material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
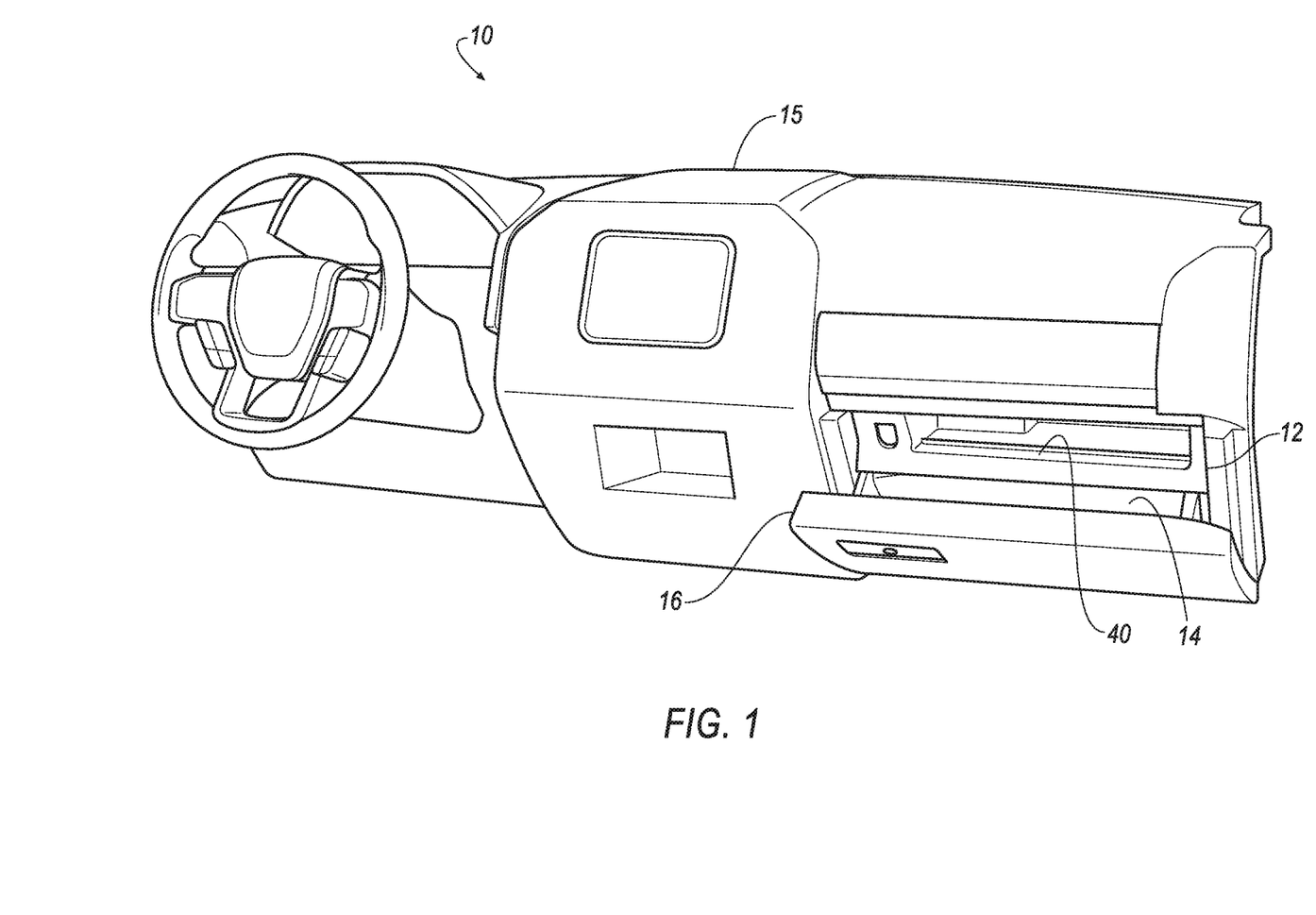
FIG. 1 is a perspective view of an interior of a vehicle with a vehicle storage compartment such as an owner's manual bin according to an embodiment of the instant disclosure.

FIG. 1 is a perspective view of an interior of a vehicle 10 with a vehicle storage compartment such as an owner's manual bin 12 (hereinafter "bin") according to an embodiment of the instant disclosure. In the illustrated embodiment, the bin 12 is disposed within a glove compartment 14 in the instrument panel 15 of the vehicle 10. The bin 12 is disposed at the top of the compartment and is accessible by opening a door 16 to the glove compartment 14. In other embodiments, however, the bin 12 may be disposed elsewhere in the vehicle 10.

Figure 2:
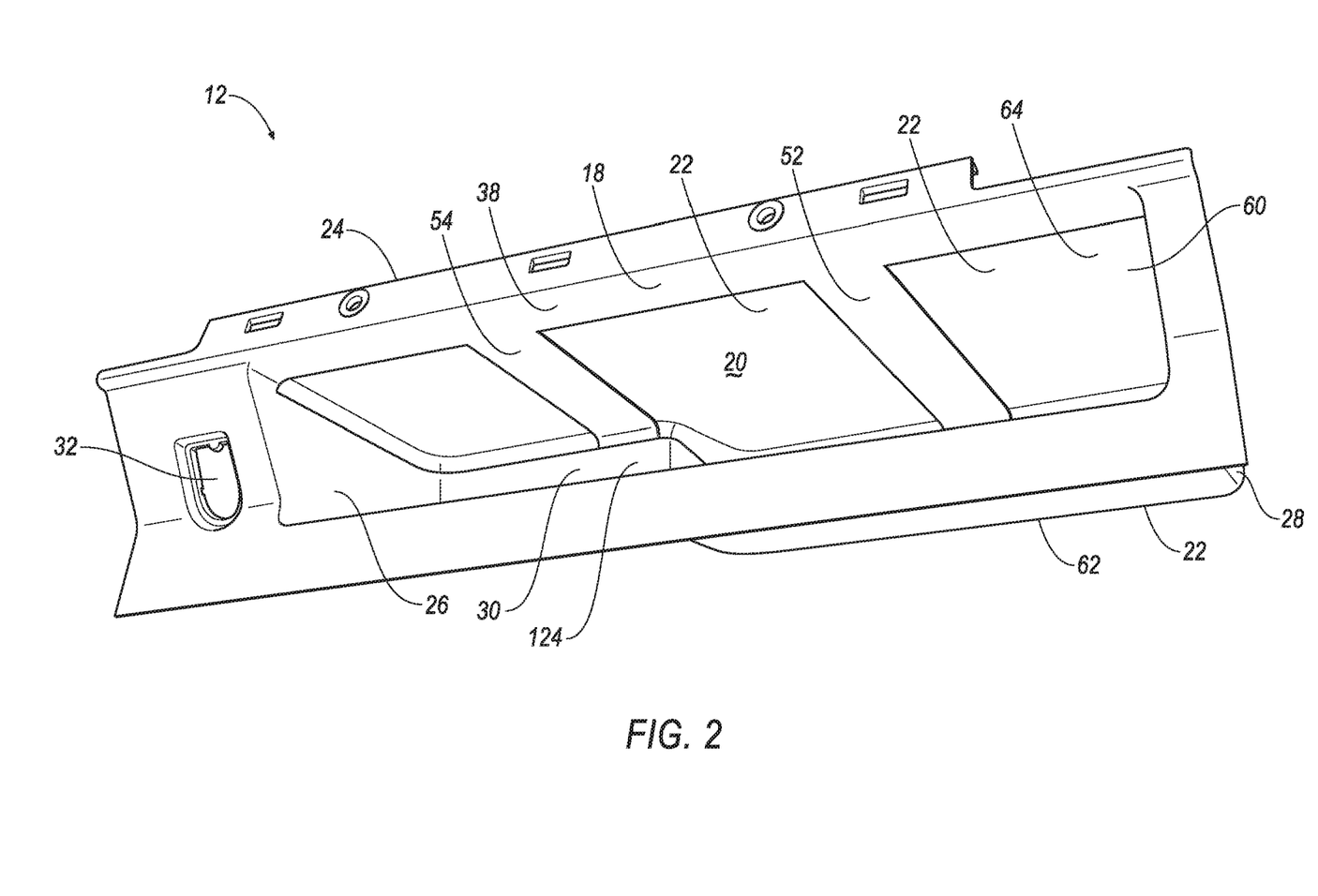
FIG. 2 is a front perspective view of the bin of FIG. 1.

FIG. 2 is a front perspective view of the bin 12 of FIG. 1. The bin 12 includes a structural skeletal frame 18 that provides structure to and forms a support for the bin 12 such that the bin 12 can support the owner's manual or other items stored therein. The frame 18 may extend from an opening 20 of the bin 12. The bin 12 further includes a compressible shell 22 in contact the frame 18 to form a body of the bin 12 and to define an interior of the bin 12. In the illustrated embodiment, the frame 18 is shaped to accommodate the interior of the bin 12 defined by the shell 22.

Figure 3:
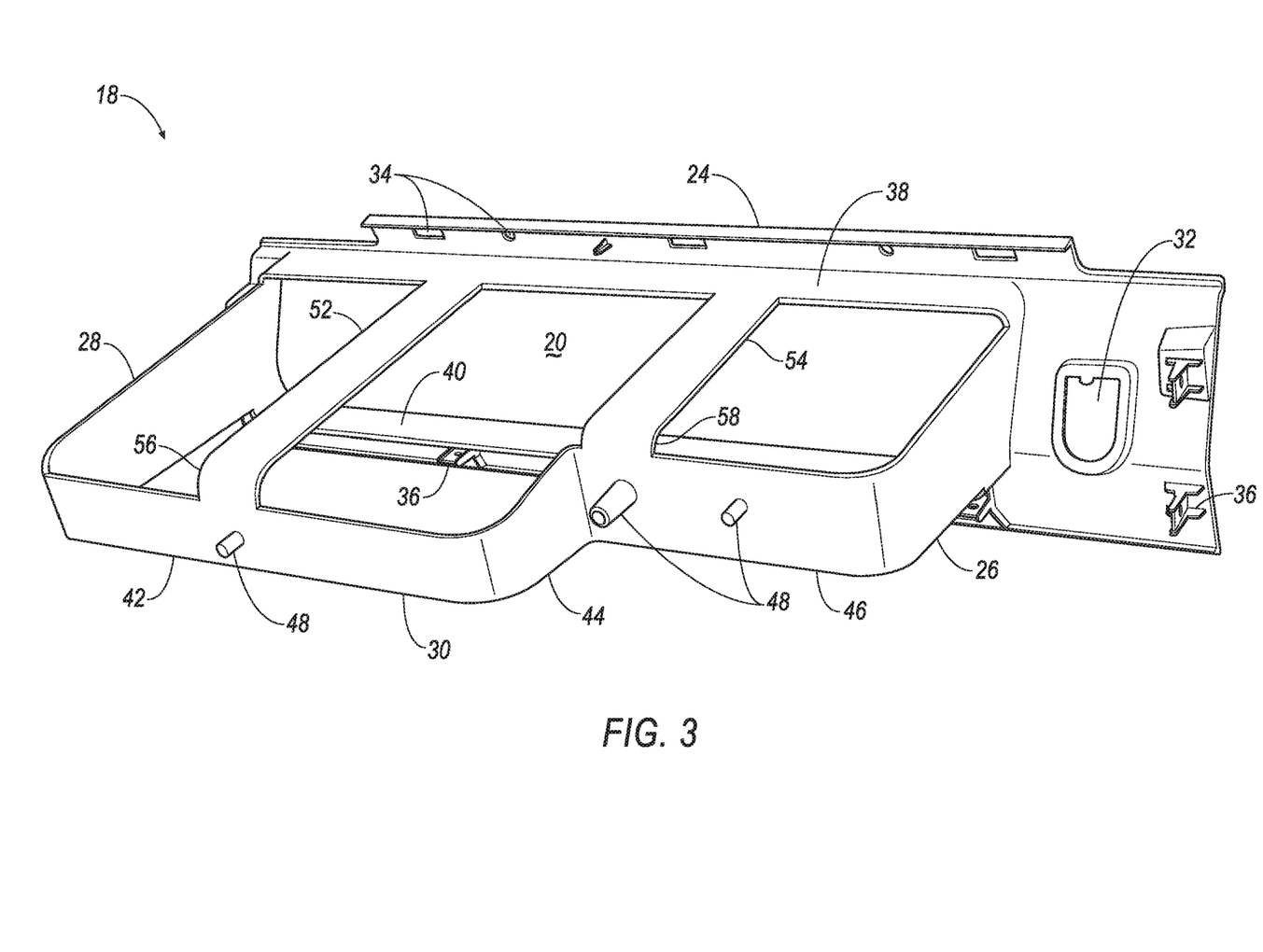
FIG. 3 is a rear perspective view of a frame of the bin of FIG. 1.

FIG. 3 is a rear perspective view of the frame 18 of the bin 12 of FIG. 1. In the illustrated embodiment, the frame 18 has a front perimeter 24 defining the opening 20 of the bin 12, lateral sides 26, 28 opposed of one another and extending from the front perimeter 24, and a back 30 disposed opposite the opening 20. The front perimeter 24 serves as the face plate of the bin 12 and may include an aperture 32 for providing access to mechanism for actuating a light in the glove compartment 14. The front perimeter 24 may also include other apertures 34 and clips 36 for fastening the bin 12 to surrounding component(s) in the vehicle 10. The front perimeter 24 may also include a top beam 38 inwardly adjacent to the opening 20 extending laterally between and connecting the sides 26, 28 to support the compressible shell 22. In the illustrated embodiment, the top beam 38 curves downward on both ends to connect with the top of the sides 26, 28. The front perimeter may further include a bottom beam 40 opposite the top beam 38 and inwardly adjacent to the opening 20. The bottom beam extends laterally between and connects the sides 26, 28 and also serves to support the shell 22. In the illustrated embodiment, the bottom beam 40 curves upward on both ends to connect with the bottom of the sides 26, 28. In the illustrated embodiment, the beams 38, 40 are similar in shape and size.

Still referring to FIG. 3, the sides 26, 28 are lateral sides of the bin 12 and extend from the front perimeter 24 to the back 30. The sides 26, 28 have different lengths to give the bin 12 an L-shape. In other embodiments, however, the sides 26, 28 may have the same length. Moreover, the bin 12 may take on a variety of different shapes and sizes, which may depend on the available space and the surrounding components in the instrument panel, for example. A height of the sides 26, 28 gradually decreases toward the back 30 such at the height of the sides 26, 28 adjacent the back 30 is less than the height of the sides 26, 28 adjacent the opening 20 (to aid in manufacturing, for example).

With continued reference to FIG. 3, the back 30 of the frame 18 may have three segments 42, 44, 46 to accommodate the different lengths of the sides 26, 28 and to give the bin 12 an L-shape, as discussed above. In the illustrated embodiment, the segment 42 extends from the side 28 at a right angle relative to the side 28 and couples with the segment 44. The segment 44 extends inwardly into the interior of the bin 12 at a right angle relative to segments 42, 46 such that the segment 44 is disposed in the same angular orientation as the sides 26, 28. The segment 46 extends in the same direction as segment 42 between segment 44 and side 26 such that the segment 46 is disposed at a right angle relative to the side 26.

The frame 18 also includes pins 48 projecting outwardly from an exterior surface 50 of the back 30. The pins 48 aid in securing the shell 22 to the frame 18 as described below. The pins project outwardly from segments 42, 46. One of ordinary skill in the art will understand there are numerous ways to secure the shell 22 to the frame 18 with or without the use of the pins 48. Moreover, in other embodiments, more or less than three pins 48 are used, and the pins 48 may be disposed in different areas of the frame 18.

Still referring to FIG. 3, the frame may also include top bridges 52, 54 that aid in supporting the shell 22. The top bridges 52, 54 extend in a direction perpendicular to and from the top beam 38 to the back 30. The top bridges 52, 54 have longitudinal ends 56, 58 that curve downward to couple with the top of the back 30. The top bridge 52 connects with segment 42, and the top bridge 54 connects with segment 46. As such, the top bridges 52, 54 in the illustrated embodiment have different lengths. Although the top bridges are illustrated as extending in the same direction to the same element and have the same width, one of ordinary skill in the art will understand that the top bridges may be oriented, shaped, and sized in ways different than each other and different from the illustrated embodiment. For example and without limitation, the frame may include bottom bridges extending from the bottom beam 40 to the back 30.

Furthermore, the junctions between the elements of the frame 18 as illustrated as being rounded for aesthetic reasons and to accommodate the interior of the shell 22. However, the junctions (i.e., corners) may be right angles in other embodiments. Additionally, although the frame 18 in the illustrated embodiment has a front perimeter 24 with top and bottom beams 38, 40, sides 26, 28, back 30, and top bridges 52, 54, one of ordinary skill in the art will understand that the frame 18 may include some of those elements or more elements within the spirit and scope of the instant disclosure.

Figure 4:
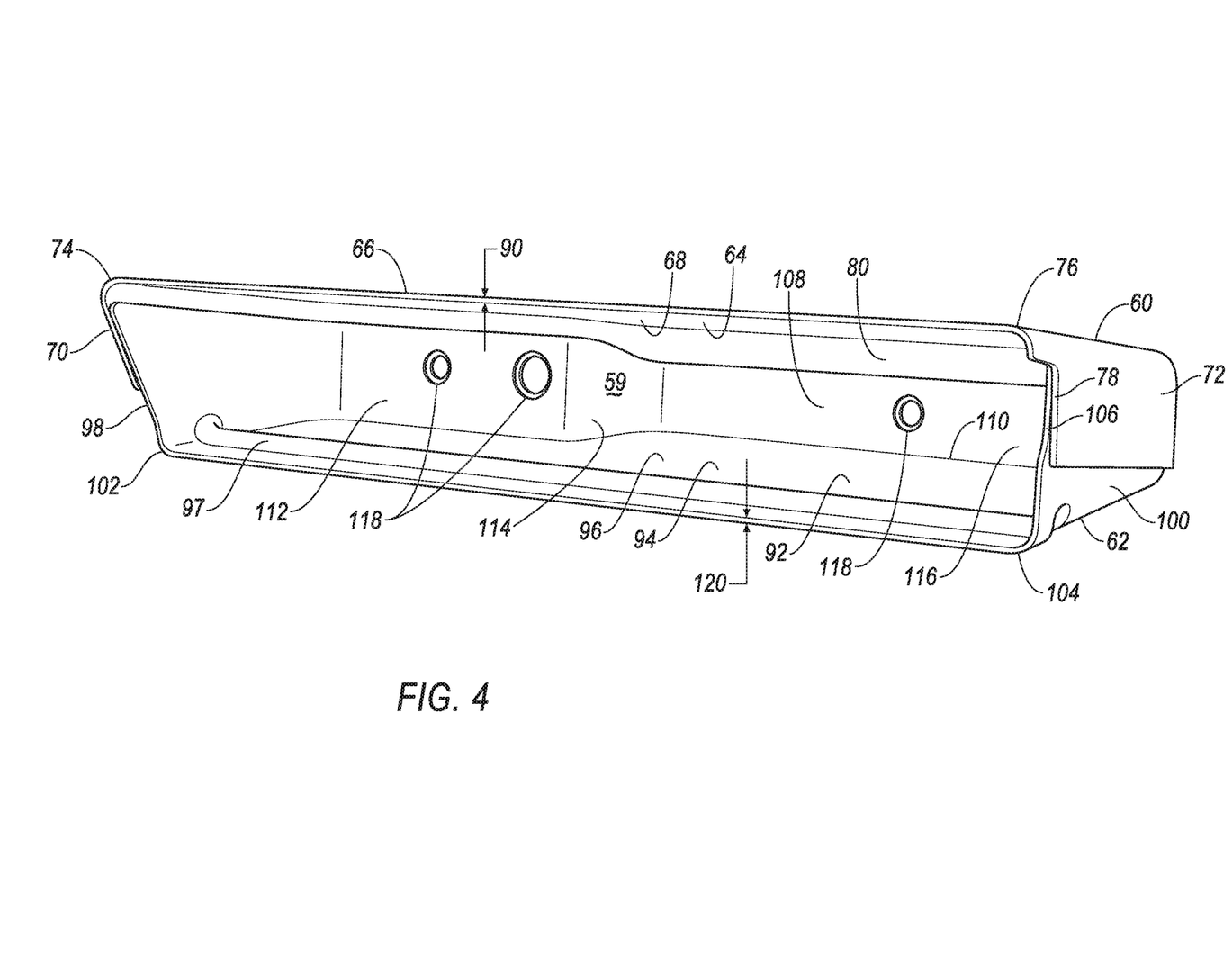
FIG. 4 is a front perspective view of a compressible shell of the bin of FIG. 1 prior to assembly with the frame illustrated in FIG. 3.

FIG. 4 is a front perspective view of the compressible shell 22 of the bin 12 of FIG. 1 prior to assembly with the frame 18. The shell 22 forms the interior of the bin 12 and is in contact with the frame 18 when assembled therewith. The shell 22 has an open end 59 adjacent the opening 20 of the bin 12. In the illustrated embodiment, the shell 22 has two halves 60, 62. When assembled, the half 60 is nested over the half 62 (i.e., the half 62 is nested within the half 60). Each half 60, 62 has an open end (adjacent the opening 20 of the bin 12) that defines the open end 59 of the shell 22.

The half 60 is the top half and defines a ceiling 64 of the interior of the bin 12. The half 60 has a horizontal portion 66 with an interior surface 68 defining the ceiling 64. When assembled to the frame 18, the horizontal portion 66 is sloped slightly downwards relative to a horizontal axis to accommodate the decrease in height in the frame 18. In other embodiments, however, the frame 18 and shell 22 have a uniform height throughout. The half 60 further has sides 70, 72 extending downwards from lateral ends 74, 76 of the horizontal portion 66. The sides 70, 72 have different lengths to give the bin 12 an L-shape, as described above in connection with the frame 18. In other embodiments, however, the sides 70, 72 may have the same length. The shell 22 can take on a variety of different shapes and sizes. The junctions between the sides 70, 72 and horizontal portion 66 are rounded, as discussed above. The sides 70, 72 extend downward at a right angle relative to the horizontal portion 66. The side 72 has a notch 78 cut out in a front end of the side 72 to accommodate the clips 36 of the right side of the frame 18. The notch 78 is generally rectangular in shape.

Figure 5:
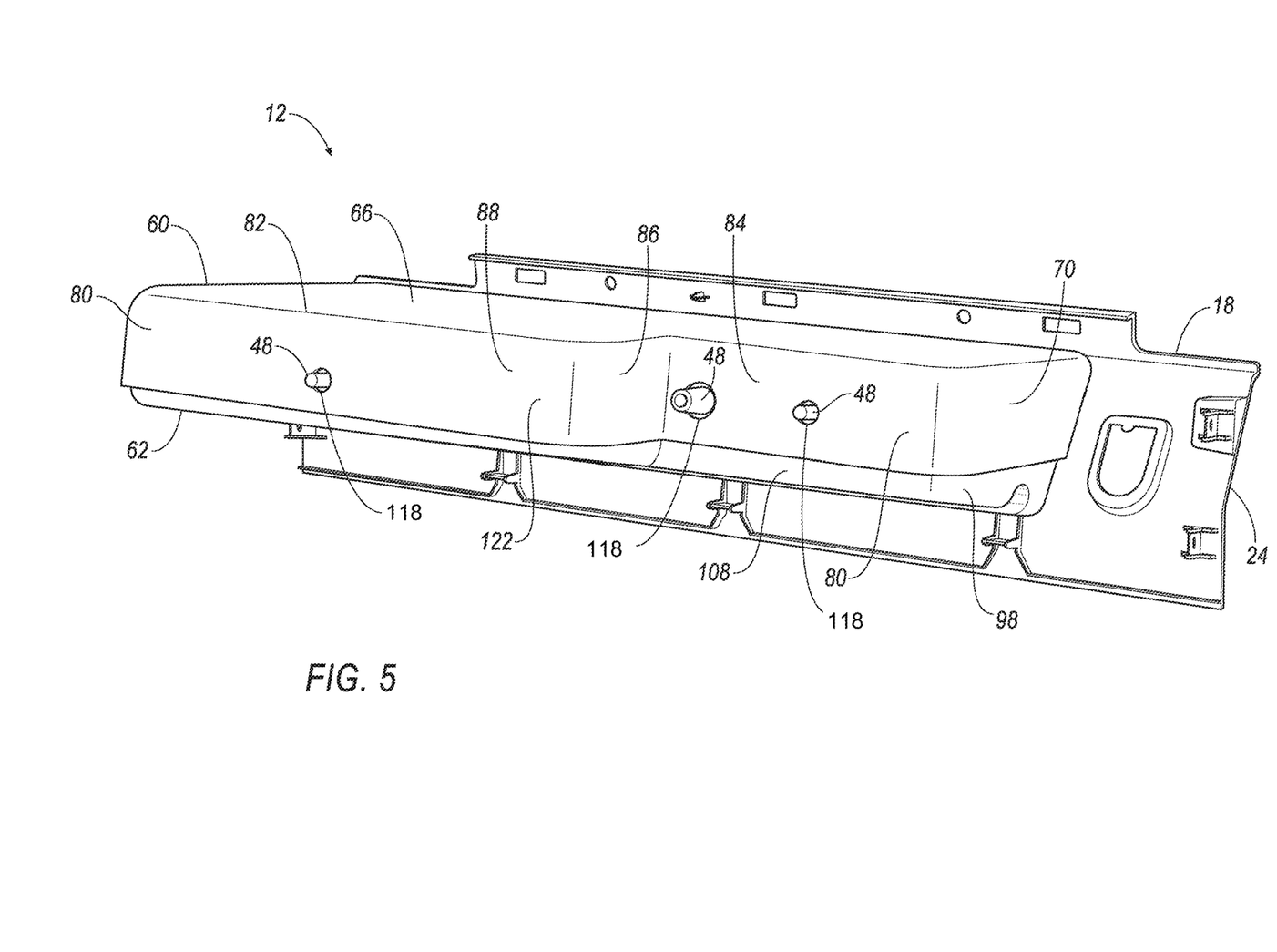
FIG. 5 is a rear perspective view of the bin of FIG. 1.

The half 60 further includes a back 80 extending downward from a rear end 82 of the horizontal portion 66. The back 80 also extends between and is coupled with rear ends of the sides 70, 72. The sides 70, 72 are disposed at right angles relative to the back 80. In the illustrated embodiment, the back 80 is shaped similarly to the back 30 of the frame 18. As shown in FIG. 5, the back 80 may have three segments 84, 86, 88 to accommodate the different lengths of the sides 70, 72. In the illustrated embodiment, the segment 84 extends from the side 70 at a right angle relative to the side 70 and couples with the segment 86. The segment 86 extends inwardly toward the opening 20 of the bin 12 at a right angle relative to segments 84, 88 such that the segment 86 is disposed in the same angular orientation as the sides 70, 72. The segment 88 extends in the same direction as segment 84 between segment 86 and side 72 such that the segment 88 is disposed at a right angle relative to the side 72. The back 80 also includes apertures 118 formed in segments 84, 88 for receiving the pins 48 of the frame 18, as described above. The junctions between the horizontal portion 66 and back 80 and between the back 80 and sides 70, 72 are rounded to accommodate material selection, for example. In one embodiment, the half 60 has a uniform thickness 90 throughout.

The half 62 is a bottom half and defines a floor 92 of the interior of the bin 12. The half 62 has a horizontal portion 94 with an interior surface 96 defining the floor 92. The floor 92 is disposed opposite the ceiling. When assembled to the frame 18, the horizontal portion 94 generally lies flat (i.e., not sloped relative to a horizontal axis). The floor 92 has a ridge 97 protruding upwardly from the floor 92 and into the interior of the bin 12 and abuts a portion of the frame 18, described in more detail below. The ridge 97 extends between and couples to interior surfaces of sides 98, 100. The ridge 97 also serves to aid in retaining the owner's manual inside the bin 12.

The half 62 further has sides 98, 100 extending upwards from lateral ends 102, 104 of the horizontal portion 94. The sides 98, 100 have different lengths to give the bin 12 an L-shape, as discussed above in connection with the frame 18. In other embodiments, however, the sides 98, 100 may have the same length. The junctions between the sides 98, 100 and horizontal portion 94 are rounded. The sides 98, 100 extend upward at a right angle relative to the horizontal portion 94. The side 100 has a notch 106 cut out in a front end of the side 100 for accommodating the clips 36 on the right side of the frame 18. The notch 106 is laterally and vertically aligned with the notch 78 of half 60.

The half 62 further includes a back 108 extending upward from a rear end 110 of the horizontal portion 94. The back 108 also extends between and is coupled with rear ends of the sides 98, 100. The sides 98, 100 are disposed at right angles relative to the back 80. In the illustrated embodiment, the back 108 is shaped similarly to the back 30 of the frame 18 and to the back 80 of the half 60 of the shell 22. The back 108 may have three segments 112, 114, 116 to accommodate the different lengths of the sides 98, 100. In the illustrated embodiment, the segment 112 extends from the side 98 at a right angle relative to the side 98 and couples with the segment 114. The segment 114 extends inwardly toward the opening 20 of the bin 12 at a right angle relative to segments 112, 116 such that the segment 114 is disposed in the same angular orientation as the sides 98, 100. The segment 116 extends in the same direction as segment 112 between segment 114 and side 100 such that the segment 116 is disposed at a right angle relative to the side 100. The back 108 also includes apertures 118 formed in segments 112, 116 for receiving the pins 48 of the frame 18, as described above. The apertures 118 are formed in a nested portion 122 of the halves 60, 62. The junctions between the horizontal portion 94 and back 108 and between the back 108 and sides 98, 100 are rounded, as discussed above. In one embodiment, the half 62 has a uniform thickness 120 throughout.

FIG. 5 is a rear perspective view of the bin 12 of FIG. 1. In an assembled state (as shown), the half 60 is nested over the half 62 forming the nested portion 122. In the illustrated embodiment, the back 80 and sides 70, 72 of the half 60 nest the back 108 and sides 98, 100 of the half 62, respectively. The open end of the half 60 abuts a top of the front perimeter 24 of the frame 18, and the open end of the half 62 abuts a bottom of the front perimeter 24 of the frame 18 (opposite the top). In the illustrated embodiment, the open end of the shell 22 is disposed over and around the top and bottom beams 38, 40 of the frame 18 (as shown at least in FIGS. 1 and 2).

Figure 6:
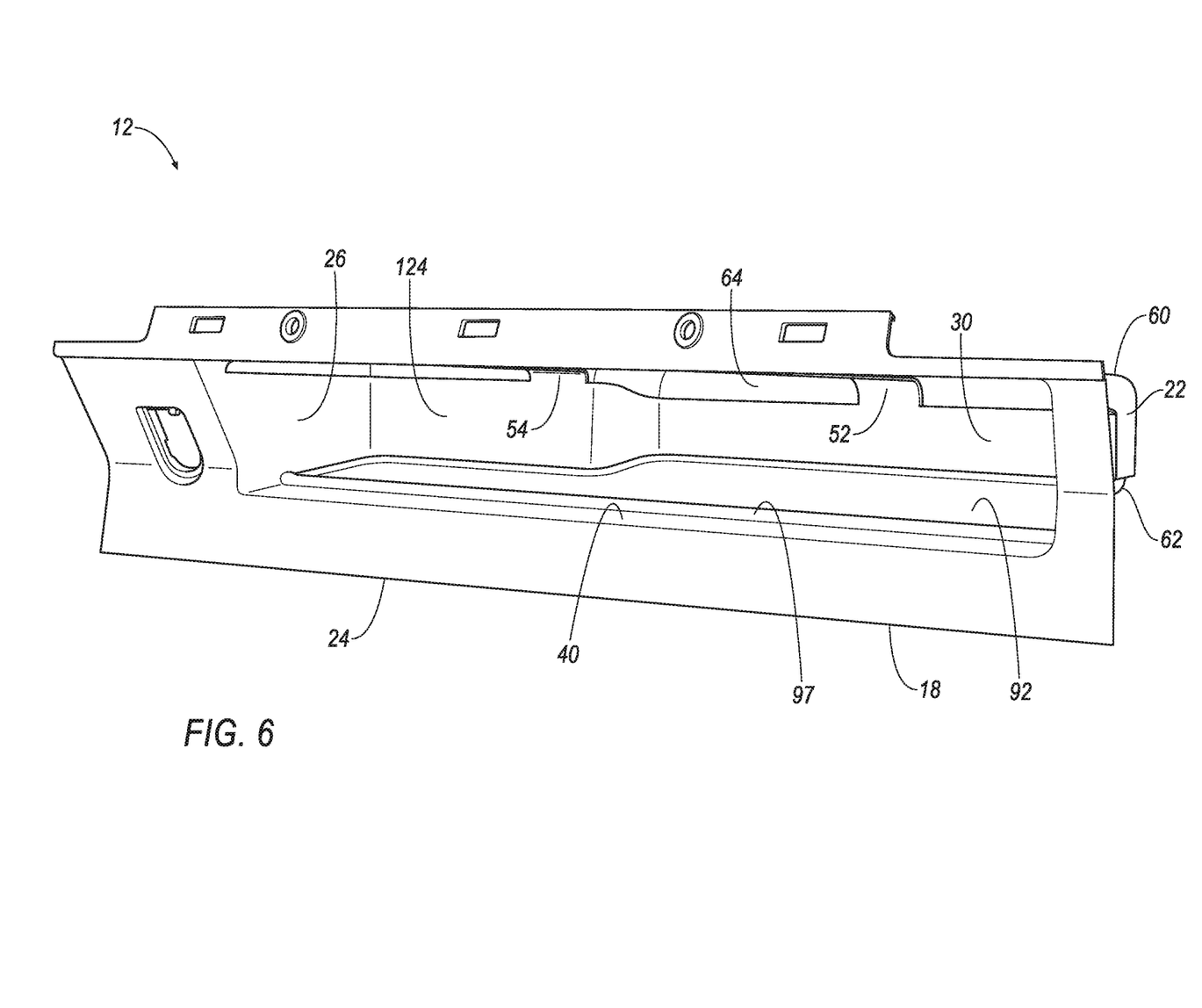
FIG. 6 is another front perspective view of the bin of FIG. 1.

FIG. 6 is another front perspective view of the bin 12 of FIG. 1. The shell 22 is supported on and in contact with the back 30 and sides 26, 28 of, and enveloping, the frame 18 to form the bin 12 having interior rear walls 124 partially defined by exposed surfaces of the frame 18. In the illustrated embodiment, the shell 22 is also supported on and in contact with the top bridges 52, 54. As shown, the halves 60, 62 of the shell 22 are nested together around the back 30 and sides 26, 28 of the frame 18 forming the interior ceiling 64 and floor 92 of the bin 12. Furthermore, the shell 22 extends from the front perimeter 24 of the frame 18 to define the interior of the bin 12. The ridge 97 of the floor 92 abuts the bottom beam 40 of the front perimeter 24 of the frame 18.

Although the illustrated embodiment shows the shell 22 being disposed over and around portions of the frame 18, one of ordinary skill in the art will understand other configurations. For example and without limitation, the frame 18 may be disposed outside of the shell 22 with the open end 59 of the shell 22 being disposed over the top and bottom beams 38, 40. Furthermore, the frame may have less or more elements than the elements shown in the illustrated embodiment. For example and without limitation, the frame may include one side, which may or may not be a lateral side. In addition, although the bin 12 is illustrated as generally having an L-shape, the bin 12 may have other shapes and sizes depending on the vehicle application. Also, although the back 30 and sides 26, 28 of the frame 18 extend the respective lengths and width of the backs 80, 108 and sides 70, 72, 98, 100 of the shell 22, the back 30 and the sides 26, 28 of the frame 18 may have different lengths. In addition, although the illustrated embodiment shows the shell 22 as being two halves 60, 62, the shell may be a one-piece construction as well.

In one embodiment, the shell 22 and frame 18 comprise the same material. The material may be metal, plastic, rubber, for example. In some embodiments, the shell 22 and frame 18 may comprise different materials such that the shell 22 is less rigid and more collapsible than the frame 18. For example and without limitation, the shell 22 may comprise a material with a density in the range of 600 g/m² to 1,800 g/m², and the frame 18 may comprise a material with a density in the range of 0.75 g/cm³ to 1.5 g/cm³, such that the shell 22 is more collapsible than the frame 18 and the frame 18 is stiffer than the shell 22. In one particular embodiment, the shell comprises a fibrous material such as compressed polyethylene terephthalate (PET), which is a thermal formed PET batting (fibers compressed together as a sheet), and the frame comprises a thermoplastic polymer (such as a plastic). The shell 22 may also comprise EPP, expanded polypropylene plastic foam in some embodiments.

The illustrated embodiment can result in a femur load reduction and a decrease in mass (of the bin 12) of 100 g, as compared to a bin comprising entirely of plastic.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle storage compartment comprising:
   a structural skeletal frame; and
   a compressible shell supported on and in contact with back and sides of, and enveloping, the skeletal frame to form an owner's manual bin having interior rear walls partially defined by exposed surfaces of the skeletal frame.

2. The vehicle storage compartment of claim 1, wherein the sides of the structural skeletal frame are lateral sides opposed to one another, and wherein each of the sides extends from an opening of the owner's manual bin to the back of the skeletal frame.

3. The vehicle storage compartment of claim 2, wherein the structural skeletal frame includes a first top bridge extending from the opening to the back of the skeletal frame between the lateral sides, and wherein the compressible shell is supported on and in contact with the first top bridge.

4. The vehicle storage compartment of claim 3, wherein the structural skeletal frame further includes a second top bridge extending from the opening to the back of the skeletal frame between the lateral sides, and wherein the compressible shell is supported on an in contact with the second top bridge.

5. The vehicle storage compartment of claim 1, wherein the compressible shell includes top and bottom halves nested together around the back and sides of the structural skeletal frame forming an interior ceiling and floor of the owner's manual bin.

6. The vehicle storage compartment of claim 5, wherein the structural skeletal frame further includes a pin projecting outwardly from an exterior surface of the back of the frame and through apertures formed in a nested portion of the top and bottom halves of the compressible shell.

7. The vehicle storage compartment of claim 1, wherein the structural skeletal frame has a front perimeter defining an opening to the owner's manual bin, and wherein the sides of the skeletal frame extend from the perimeter.

8. The vehicle storage compartment of claim 7, wherein an open end of the compressible shell contacts and is disposed over and around a portion of the front perimeter of the structural skeletal frame.

9. The vehicle storage compartment of claim 8, wherein a floor of the owner's manual bin defined by the compressible shell has a ridge protruding upwardly from the floor that abuts the front perimeter of the structural skeletal frame.

10. A vehicle storage compartment comprising:
a skeletal frame forming a support for an owner's manual bin, the frame having a front perimeter defining an opening to the bin, a first side extending from the perimeter, and a back disposed opposite the opening; and
a compressible shell disposed over and extending from the perimeter to define an interior of the bin, the shell being in contact with the back and first side of the frame.

11. The vehicle storage compartment of claim 10, wherein the skeletal frame further includes a second side extending from the front perimeter opposite the first side.

12. The vehicle storage compartment of claim 11, wherein the first and second sides of the skeletal frame are lateral sides, and wherein each of the first and second sides extends to the back of the skeletal frame.

13. The vehicle storage compartment of claim 12, wherein a floor of the interior of the owner's manual bin defined by the compressible shell has a ridge protruding upwardly from the floor that extends between the first and second sides of the skeletal frame and abuts the front perimeter.

14. The vehicle storage compartment of claim 10, wherein the skeletal frame further includes a pin projecting outwardly from an exterior surface of the back of the frame and through an aperture formed in the compressible shell.

15. A vehicle storage compartment comprising:
a skeletal frame extending from an opening of an owner's manual bin; and
a compressible shell comprising a fibrous material supported on and in contact with back and lateral sides of, and enveloping, the frame to form a body of the bin having interior walls defined by exposed surfaces of the frame and the fibrous material.

16. The vehicle storage compartment of claim 15, wherein the fibrous material has a density in the range of 600 $g/m^2$ to 1,800 $g/m^2$, and the skeletal frame comprises a thermoplastic polymer with a density in the range of 0.75 $g/cm^3$ to 1.5 $g/cm^3$.

17. The vehicle storage compartment of claim 15, wherein the skeletal frame includes a first top bridge extending from the opening to the back of the skeletal frame between the lateral sides of the skeletal frame.

18. The vehicle storage compartment of claim 15, wherein the compressible shell includes top and bottom halves nested together around the back and lateral sides of the skeletal frame.

19. The vehicle storage compartment of claim 15, wherein the skeletal frame includes a front perimeter defining the opening to the owner's manual bin, and wherein the lateral sides of the skeletal frame extend from the perimeter.

20. The vehicle storage compartment of claim 19, wherein an open end of the compressible shell contacts and is disposed over and around a portion of the front perimeter of the skeletal frame.

* * * * *